Figure 3:
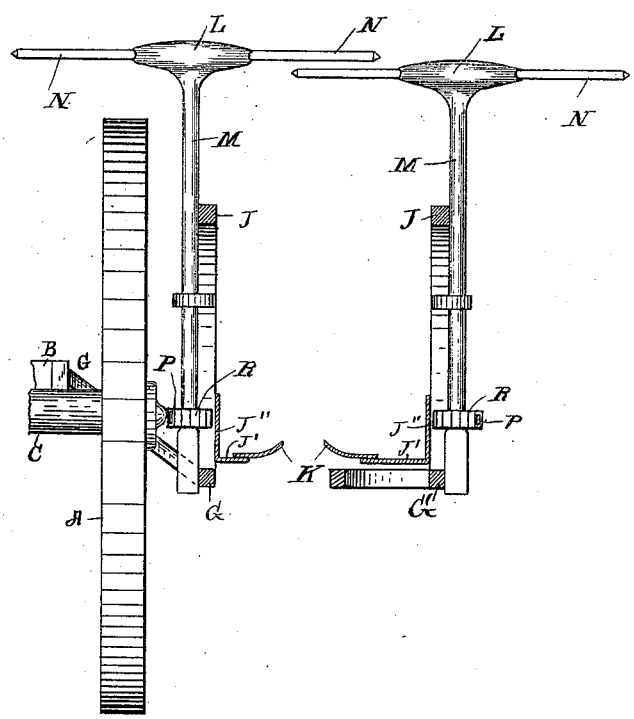

(No Model.) 2 Sheets—Sheet 1.
A. HOLLINGSWORTH.
CORN HARVESTER.
No. 376,384. Patented Jan. 10, 1888.
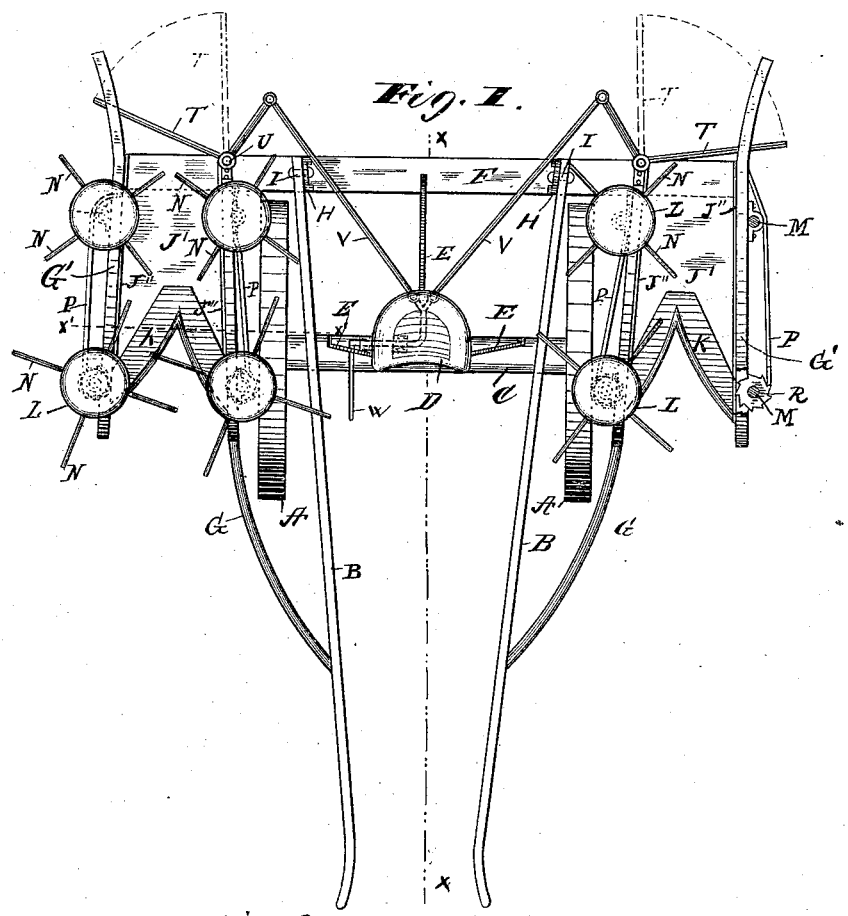
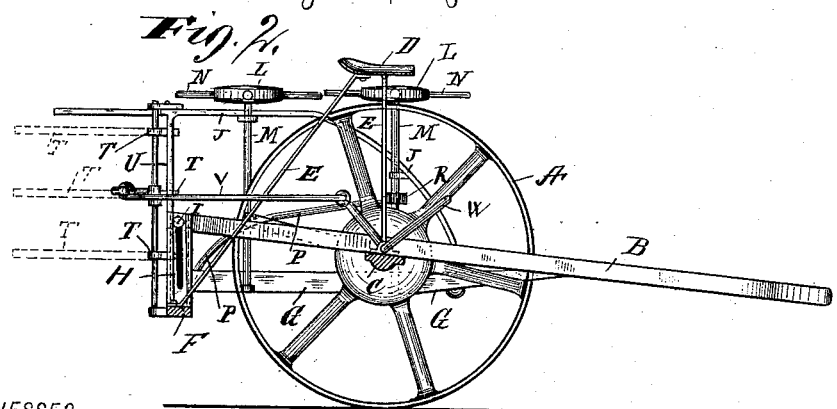
WITNESSES
INVENTOR
Alfred Hollingsworth
BY
ATTORNEYS (No Model.)
A. HOLLINGSWORTH.
CORN HARVESTER.

2 Sheets—Sheet 2.

No. 376,384.  Patented Jan. 10, 1888.

WITNESSES:
J. H. Knight.
Edward Stien.

INVENTOR
Alfred Hollingsworth
BY Knight & Bro.
ATTORNEYS

UNITED STATES PATENT OFFICE.

ALFRED HOLLINGSWORTH, OF UNION VALLEY, KANSAS.

CORN-HARVESTER.

SPECIFICATION forming part of Letters Patent No. 376,384, dated January 10, 1888.

Application filed March 8, 1887. Serial No. 230,139. (No model.)

*To all whom it may concern:*

Be it known that I, ALFRED HOLLINGSWORTH, a citizen of the United States, residing at Union Valley, in the county of Lincoln and State of Kansas, have invented certain new and useful Improvements in Corn-Harvesters, of which the following is a specification.

My invention relates to a harvester for corn, constructed with V-shaped knives on each side of a suitable vehicle on wheels, so that as the vehicle traverses a field of corn two rows at a turn will be cut, and by means of suitable devices will retain the cornstalks upon the vehicle until a sufficient quantity is accumulated to make a bundle or shock, when they can be released by the driver and deposited upon the ground.

To these ends my invention consists of a two-wheeled vehicle adapted and constructed to be drawn by a single horse, and provided with suitable thills arranged upon the axle, and having a seat for the driver located centrally between the wheels. On the outside of each wheel I arrange a cradle consisting of side frames and a longitudinal receptacle with flanges at the sides and V-shaped cutting-blades in the front thereof. This cradle constitutes a gatherer for the cornstalks as the blades sever them while traversing the rows. The knives have their edges turned upwardly and slightly rolling from the inside to the outer or cutting edges. Guides connect with the thills and extend rearward and outside of the wheels, thus inclosing them. These guides extend beneath the gatherer and rearward to the cross-bar, which connects the two gatherer-frames together and also serves as means of support for upwardly-extending arms connected to the rear ends of the thills. Means of adjustment are provided for raising and lowering the cross-bar and the guides. The cornstalk-gatherers have reel arms attached to vertical shafts—two on a side. The said reels have suitable means for locking them against a retrograde movement. As the cornstalks enter the gatherer the reels will turn and hold the stalks in position. A suitable tripping mechanism is provided for releasing the cornstalks when a sufficient amount is accumulated to make an armful.

Referring to the accompanying drawings, which form a part of this specification, Figure 1 is a plan view of my improved machine, part in section. Fig. 2 is a longitudinal section on the line $x\ x$, Fig. 1. Fig. 3 is a detail view on the line $x'\ x'$, Fig. 1.

A represents the wheels of the vehicle, and B the thills, connected to an axle, C, and having a suitable seat, D, for the driver centrally mounted by means of supports E, one of said supports extending rearward and being attached to the rear cross-bar, F, which extends transversely of the entire vehicle. Connecting with the thills B, and extending outward and alongside the wheels and attached to the rear cross-bar, are guides G. The rear cross-bar is adjustably attached to the rear ends of the thills B by means of the upwardly-extending arms H and adjusting-screws I. Outside of the wheels, and supported by the guide arms, rear cross-bar, and outside arms, G', are the cradles, consisting of side frames, J, and longitudinal bottoms J', having vertical flanges J'', which cradles receive the cornstalks as they are severed. V-shaped knives K are arranged on the bottoms of the receptacles and are provided with rolling edges, as shown in detail view, Fig. 3, so that the cornstalks are cut in a sloping direction, thus making the operation more easy and effective. In the upper portion of the cradles on the side frames are reel-heads L, arranged upon vertical shafts M, the said reel-heads being provided with fingers or arms N.

As the cornstalks are severed by the knives they enter the cradles and are held in a vertical position by the reels, which are prevented from turning backward by the locking mechanism, consisting of spring pawl-arm P and ratchet-wheel R, arranged upon the vertical reel-shafts aforesaid. At the rear end of the cradles or gatherers are gates T, pivoted to the inner upright, U, of a side frame and having levers V, connecting with the tripping-lever W, the latter being of easy access to the driver or operator. When the cradle or gatherer contains the desired amount of cut cornstalks, the gates T are opened by the driver and the stalks contained in the gatherer are permitted to drop onto the ground.

It will be seen that my invention is particularly adapted to keep the cornstalks in an upright position, and it is also particularly constructed with reference to cutting two rows of corn at the same time.

Having thus described my invention, what I claim as new therein, and desire to secure by Letters Patent, is—

In a corn-harvester, the combination of the thills B, rear cross-bar, F, supported by the rear ends of the thills, guide-arms G, extending from the thills outside the wheels to the cross-bar, outside arms, G', secured to the cross-bar, cradles consisting of side frames, J, bottoms J', and vertical side flanges, J'', the V-shaped knives secured to the front edge of the cradles, vertical shafts M, secured to the side frames, having heads L and arms N, gates hinged at the rear corner of the side frames, and means for opening and closing the gates, substantially as described.

ALFRED HOLLINGSWORTH.

Witnesses:
ED. F. COAD,
FRANCIS C. DOWNEY.